Patented Mar. 18, 1924.

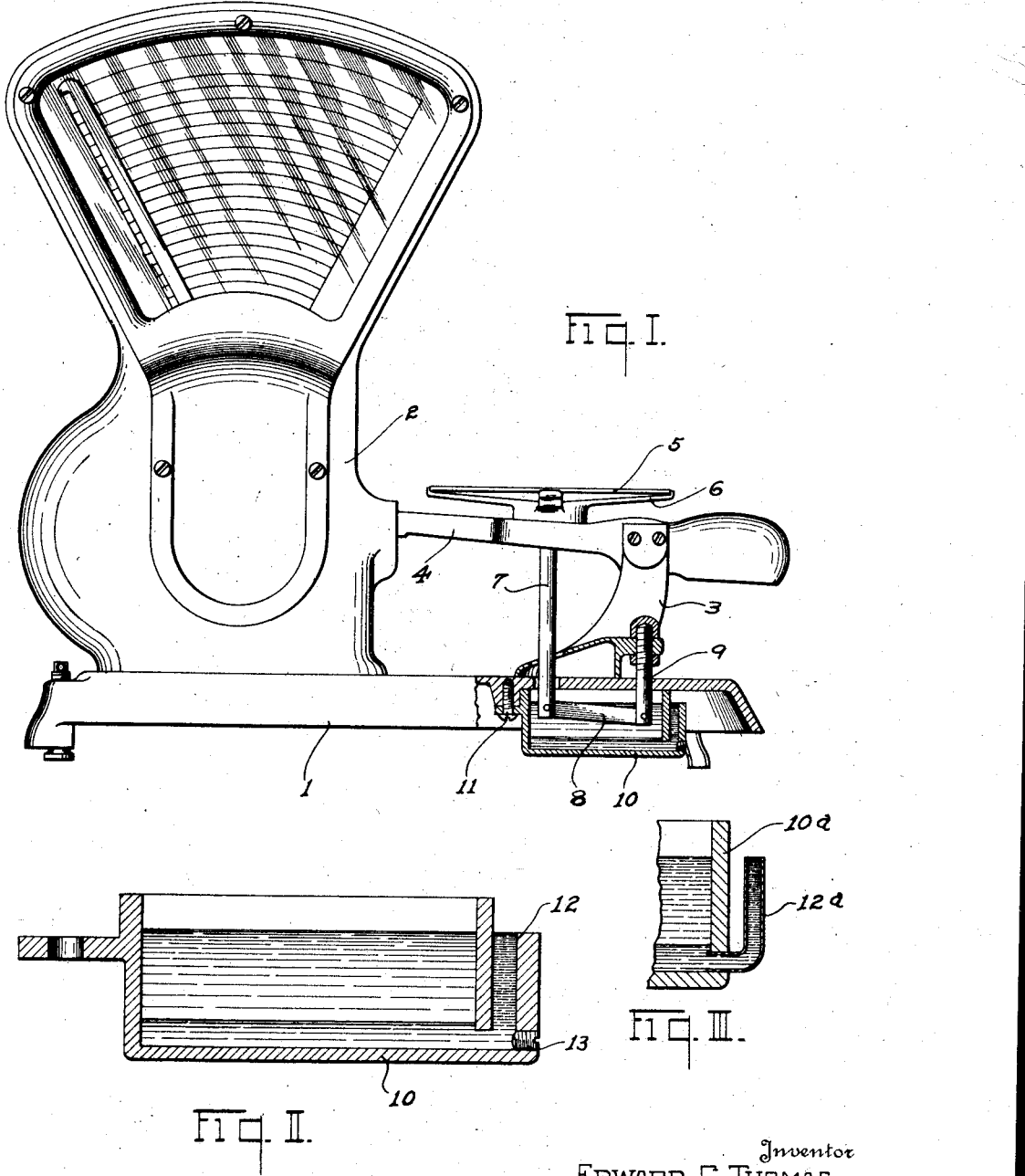

1,486,996

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

OIL CONTAINER.

Application filed October 19, 1921. Serial No. 508,901.

*To all whom it may concern:*

Be it known that I, EDWARD G. THOMAS, a citizen of the United States, residing at Toledo, in the county of Lucas and State of Ohio, have invented certain new and useful Improvements in Oil Containers, of which the following is a specification.

This invention relates to oil containers, and particularly to containers for holding oil in position so that the working parts of mechanisms are immersed therein.

When machines such as weighing scales are used in an atmosphere where they are liable to corrosion, it is sometimes desirable to keep some of the working parts immersed in oil. The check link pivots of weighing scales are, for example, sometimes thus subjected to corrosion when the scales are used in creameries.

It is one of the objects of my invention to provide means for keeping check link pivots or other mechanical parts immersed in oil.

Another object of the invention is to provide a container for oil having means for automatically draining off water or brine which may accumulate in the bottom of the container.

Other objects and advantages will be apparent from the following description, in which reference is had to the accompanying drawings illustrating preferred embodiments of my invention and wherein similar reference numerals designate similar parts throughout the several views.

In the drawings:—

Figure 1 is an elevational view of the scale in which my invention has been incorporated, parts being broken away in order to better illustrate the invention;

Figure 2 is a detail sectional view on an enlarged scale of the form of receptacle shown in Figure 1; and Figure 3 is a fragmentary detail view showing a modified form of receptacle.

Referring to the drawings in detail, and particularly to Figures 1 and 2, the base 1 of the scale shown in the drawings supports adjacent one of its ends an upright housing 2 which contains the load-offsetting mechanism (not shown). Adjacent its other end the base 1 supports a base horn or fulcrum stand 3, and the fulcrum stand in turn supports a lever 4, the nose of which extends into the housing 2, where it is connected to the load-offsetting mechanism.

The commodity-receiver of the scale illustrated consists of a platter 5 carried by a spider 6 which is pivotally supported in the usual manner by the lever 4. The platter is held in horizontal position during weighing movements of the lever by means of a spider stem 7 and a check link 8, the spider stem extending downwardly through the base 1 and having a pivotal connection with one end of the link 8, the other end of the link being connected to the lower end of a shift post 9.

In order that the scale may weigh correctly without regard to the position of the load on the platform, it is necessary that the fulcrum and load pivots on the lever 4 and the pivots at the end of the check link 8 lie at corners of a parallelogram. It is also necessary that the pivots operate without friction. When scales of this type are used in creameries, the presence of salt and moisture is liable to result in rapid corrosion of the pivots, and this corrosion is especially detrimental to the pivots of the check link, as it causes friction in the operation of the scale and wear, which destroys the parallelogrammatic relation of the check link and lever pivots. I have, therefore, provided a receptacle for the check link mechanism which is adapted to contain oil so that the check link pivots are submerged and thus protected from the action of salt and water.

The receptacle 10 is secured to the under side of the base 1 by means of a screw 11, and forms a protective housing for the check link mechanism, as well as a receptacle for oil. Owing to the fact that some of the moisture which condenses upon the spider stem and other parts may find its way into the oil and because water may trickle into it when the scale is being washed, I have provided a passage 12 leading from the lower part of the interior of the receptacle and extending upwardly outside thereof to a level somewhat below that of the top of the receptacle. When water enters the receptacle it sinks to the bottom and, were it not for the provision of the passage 12, the oil flowing on top of the water would, as the level of the water rose, flow over the top and would eventually be entirely replaced by water. By reason of the fact that the passage 12 leads from adjacent the bottom of the receptacle to a level below its top, the discharge of the fluid in the lower part of the receptacle—that is, the water—is insured and the upper surface of the oil surrounding the check link remains at the level of the upper end of the passage 12.

In the form of the device shown in Figures 1 and 2 the passage 12 is formed integrally with the receptacle, the opening from the passage into the interior of the receptacle being drilled and the hole in the outer wall of the passage through which the opening into the receptacle was drilled being closed by a screw plug 13.

In the form shown in Figure 3, the receptacle 10ª is formed without the passage and the passage 12ª consists of a bent tube, one arm of which extends horizontally into an opening in the receptacle and is secured therein, while the other arm extends upwardly to a level somewhat below that of the top of the receptacle. The operation of the form shown in Figure 3 is substantially the same as that of the form shown in Figures 1 and 2.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a weighing scale, in combination, a base, check link mechanism located below said base, and a receptacle surrounding said check link mechanism and adapted to hold oil.

2. In a weighing scale, in combination, a base, check link mechanism located below said base, a receptacle, means for securing said receptacle in position to retain oil about said check link mechanism, and means for automatically discharging surplus liquid from the lower part of said receptacle, whereby the liquid retained in said receptacle is prevented from flowing over the upper edge of said receptacle.

3. In a weighing scale, in combination, a base, check link mechanism located below said base, a receptacle, means for securing said receptacle in position to retain oil about said check link mechanism, and a passage leading from the interior of said receptacle adjacent the bottom thereof to a level below the level of the top of said receptacle.

4. In a weighing scale, in combination, a base, check link mechanism located below said base, a receptacle surrounding said check link mechanism and adapted to hold oil in position in which said check link mechanism is immersed therein, and a passage leading from within said receptacle adjacent the bottom thereof upwardly exteriorly of said receptacle and to a level below the top of said receptacle.

EDWARD G. THOMAS.

Witnesses:
FRANCES DOYLE,
HARRY ERNSBERGER.